(12) United States Patent
Chen et al.

(10) Patent No.: US 11,053,157 B2
(45) Date of Patent: Jul. 6, 2021

(54) OPTICAL FIBER AND MANUFACTURING METHOD THEREOF

(71) Applicant: Chengdu Futong Optical Communication Technologies Co., Ltd., Chengdu (CN)

(72) Inventors: Haibin Chen, Chengdu (CN); Jian Chen, Chengdu (CN); Qiang Chen, Chengdu (CN); Qingguo Li, Chengdu (CN); Xiaosong Jian, Chengdu (CN)

(73) Assignee: CHENGDU FUTONG OPTICAL COMMUNICATION TECHNOLOGIES CO., LTD, Chengdu (CN)

( * ) Notice: Subject to any disclaimer, the term of this patent is extended or adjusted under 35 U.S.C. 154(b) by 224 days.

(21) Appl. No.: 16/322,122

(22) PCT Filed: Aug. 23, 2017

(86) PCT No.: PCT/CN2017/098588
§ 371 (c)(1),
(2) Date: Jan. 31, 2019

(87) PCT Pub. No.: WO2019/036925
PCT Pub. Date: Feb. 28, 2019

(65) Prior Publication Data
US 2020/0270165 A1    Aug. 27, 2020

(51) Int. Cl.
*C03B 37/014* (2006.01)
*C03B 37/027* (2006.01)
*G02B 6/036* (2006.01)

(52) U.S. Cl.
CPC .. *C03B 37/01473* (2013.01); *C03B 37/01446* (2013.01); *C03B 37/027* (2013.01);
(Continued)

(58) Field of Classification Search
CPC .................. C03B 37/014; C03B 37/01892
See application file for complete search history.

(56) References Cited

U.S. PATENT DOCUMENTS 4,362,545 A * 12/1982 Bailey ............... C03B 37/01486
                                                      118/728
4,629,485 A    12/1986 Berkey
(Continued)

FOREIGN PATENT DOCUMENTS

CN    103224325 A    7/2013
CN    103663958 A    3/2014
(Continued)

*Primary Examiner* — John M Hoffmann
(74) *Attorney, Agent, or Firm* — Bayramoglu Law Offices LLC

(57) ABSTRACT

This invention provides a manufacturing method for an optical fiber. In this invention, when the core layer loose body and the cladding layer loose body are deposited, the oxyhydrogen flame is used make a temperature of an interface between the core layer and the cladding layer rise, such that silicon dioxide at the interface appropriately contracts to form an isolation layer with a relatively high density. In addition, in this invention, a hollow glass tube is used as a target rod, and the hollow glass tube which is the target rod is directly connected with the core layer loose body. During the subsequent dehydration, not only a dehydration atmosphere penetrates from the outside to the inside of the cladding layer loose body, but also the dehydration atmosphere directly enters the core layer through the hollow glass tube.

13 Claims, 6 Drawing Sheets

(52) U.S. Cl.
CPC ...... *C03B 2201/12* (2013.01); *C03B 2203/23* (2013.01); *C03B 2207/50* (2013.01); *C03B 2207/62* (2013.01); *C03B 2207/64* (2013.01); *C03B 2207/81* (2013.01); *G02B 6/036* (2013.01)

(56) References Cited

U.S. PATENT DOCUMENTS

| | | | | |
|---|---|---|---|---|
| 4,826,520 | A * | 5/1989 | Kawazoe | C03B 37/0142 239/416 |
| 5,055,121 | A * | 10/1991 | Kanamori | C03B 37/01446 65/398 |
| 5,236,481 | A * | 8/1993 | Berkey | C03B 37/01446 65/17.3 |
| 2002/0116955 | A1* | 8/2002 | Enomoto | C03B 37/0142 65/415 |
| 2003/0046960 | A1* | 3/2003 | Dawes | C03C 13/04 65/391 |
| 2003/0101771 | A1* | 6/2003 | Dawes | C03B 37/01446 65/397 |
| 2003/0221460 | A1* | 12/2003 | Inoue | C03B 37/01446 65/424 |
| 2004/0107735 | A1* | 6/2004 | Fletcher | C03B 37/027 65/412 |
| 2007/0022786 | A1* | 2/2007 | Foster | C03B 37/02718 65/384 |
| 2011/0023549 | A1* | 2/2011 | Hartsuiker | C03B 37/0183 65/391 |
| 2011/0177333 | A1* | 7/2011 | Schoetz | C03B 37/01426 428/376 |

FOREIGN PATENT DOCUMENTS

| | | | | |
|---|---|---|---|---|
| CN | 105223645 A | 1/2016 | | |
| CN | 106007355 A | 10/2016 | | |
| JP | 62256733 A | * 11/1987 | ......... | C03B 37/0142 |

* cited by examiner

Figures:

OPTICAL FIBER AND MANUFACTURING METHOD THEREOF

CROSS REFERENCE TO RELATED APPLICATIONS

This application is the national phase entry of International Application No. PCT/CN2017/098588, filed on Aug. 23, 2017, the entire contents of which are incorporated herein by reference.

TECHNICAL FIELD

This invention relates to a technical field of an optical fiber and, more particularly, to an optical fiber and a manufacturing method thereof.

BACKGROUND

With rapid development of information technology, a large amount of data information needs to be transmitted quickly and accurately. Therefore, a communication optical fiber is required to have a greater communication capacity to achieve fast transmission of big data and required to have a lower attenuation loss to achieve long-distance transmission of the information. At present, through purification of raw materials and self-improvement, optimization on an attenuation index almost achieves a limit (a water peak is optimized), and the attenuation is reduced to 0.185 dB/Km. To further reduce the attenuation, it can only reduce a doping amount of a core of the optical fiber, that is, a loss of Rayleigh scattering is reduced. One method to reduce the Rayleigh scattering is that the core is not doped while the cladding is doped with F to reduce the refractive index.

Using a vapor phase axial deposition (VAD) method to manufacture a core rod loose body of the optical fiber is to use two blowtorches to deposit the loose body. A raw material gas and a doped gas enter one blowtorch, and a core loose body is formed. Only the raw material gas enters the other blowtorch, and a cladding layer loose body is formed. The two blowtorches are arranged longitudinally, and the core loose body and the cladding layer loose body grow at the same time. $GeO_2$ doped in the core has good stability and does not diffuse into the cladding layer. However, in the optical fiber with an ultra low loss, it is required that less or no $GeO_2$ is doped in the core, and the F element is doped in the cladding layer to reduce the refractive index. A chemical reaction equation of the cladding layer doped with F is as follows:

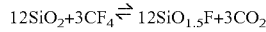

$$12SiO_2 + 3CF_4 \rightleftharpoons 12SiO_{1.5}F + 3CO_2$$

However, at present, when the VAD method is used to manufacture the core rod loose body, stability of silicon oxyfluoride formed by the reaction is extremely poor, and the F element in the cladding layer is likely to diffuse into the core loose body. After the core rod is sintered, the refractive index of the core is also reduced, and a difference between the refractive index of the core layer and the refractive index of the cladding layer cannot meet the requirement, thereby increasing the attenuation of the obtained optical fiber.

Therefore, in order to prevent the cladding layer F from diffusing into the core layer during deposition, at present, an outside vapor deposition (OVD) method is mostly used to artificially add a $SiO_2$ isolation layer with a relatively high density at an interface between the core layer and the cladding layer to prevent F from diffusing into the core layer. A qualified core rod of the optical fiber with an ultra low attenuation is obtained by dehydrating and sintering Please see FIG. 1, and FIG. 1 is a sectional view of the core rod loose body of the optical fiber with the ultra low attenuation, which is composed of an F doped cladding layer, the isolation layer, and a pure $SiO_2$ core layer. As the density of the isolation layer is relatively high, the isolation layer at the interface between the core layer and the cladding layer can well prevent the F element doped into the cladding layer from penetrating into the core layer during deposition and vitrification. However, when the loose body enters the process of dehydrating and sintering, it is also because that the density of the isolation layer is too high, the dehydration atmosphere cannot enter the isolation layer, resulting in that the dehydration atmosphere in the core layer loose body is insufficient, and —OH in the core layer loose body cannot be scavenged. Therefore, the final obtained optical fiber has an attenuation loss of 2 dB/km at a wavelength of 1383 nm, which is much higher than the loss of 0.3 dB/km of a conventional G.652D optical fiber at the wavelength of 1383 nm.

Therefore, how to use the VAD method to manufacture an optical fiber with an ultra low attenuation and make the water peak reach the standard is an urgent problem to be solved.

SUMMARY

In view of this, a technical problem to be solved in this invention is to provide an optical fiber and a manufacturing method thereof. This invention adopts a vapor phase axial deposition (VAD) method to manufacture an optical fiber with an ultra low loss and a low water peak.

This invention provides a manufacturing method for an optical fiber, including the following steps:

A) using a hollow glass tube as a target rod, adopting a vapor phase axial deposition (VAD) method to manufacture a core rod loose body with a core layer loose body, a silicon dioxide isolation layer, and a cladding layer loose body sequentially arranged from inside out, and using a first blowtorch, a second blowtorch, and a third blowtorch for deposition, wherein gases entering the first blowtorch are $H_2$, $O_2$, Ar, and $SiCl_4$, and the core layer loose body is formed; gases entering the second blowtorch are $H_2$ and $O_2$, the silicon dioxide isolation layer is formed, a flow rate of $H_2$ entering the second blowtorch is in a range of 12-15 L/min, and a flow rate of $O_2$ entering the second blowtorch is in a range of 10-12 L/min; gases entering the third blowtorch are $H_2$, $O_2$, Ar, $SiCl_4$, and $CF_4$, and the cladding layer loose body is formed; and the hollow glass tube includes a hollow tube body and an open deposition tip communicating with a tail end of the hollow tube body, and the core layer loose body is connected with the deposition tip;

B) dehydrating the core rod loose body, wherein a dehydration atmosphere enters the core layer loose body through the hollow glass tube and penetrates from an outside to an inside of the cladding layer loose body to obtain a dehydrated core rod loose body;

C) sequentially sintering, extending, and washing corrosively the dehydrated core rod loose body and forming an outer cladding layer on a surface to obtain a preform; and D) drawing the preform to obtain an optical fiber with an ultra low loss.

Preferably, the first blowtorch, the second blowtorch, and the third blowtorch may be sequentially arranged from bottom to top.

Preferably, the first blowtorch and the second blowtorch may be arranged in parallel, an angle between the first blowtorch and a horizontal plane may be in a range of 38°-50°, and an angle between the third blowtorch and the horizontal plane may be in a range of 35°-45°.

Preferably, a flame length from a blowtorch mouth of the first blowtorch to the core rod loose body may be in a range of 40-50 mm, a flame length from a blowtorch mouth of the second blowtorch to the core rod loose body may be in a range of 80-90 mm, and a flame length from a blowtorch mouth of the third blowtorch to the core rod loose body may be in a range of 120-160 mm.

Preferably, a distance between a center point of a blowtorch mouth of the first blowtorch and a center point of a blowtorch mouth of the second blowtorch may be in a range of 70-80 mm, and a distance between the center point of the blowtorch mouth of the second blowtorch and a center point of a blowtorch mouth of the third blowtorch may be in a range of 100-130 mm.

Preferably, the first blowtorch may include a raw material supply pipe located at a center of the first blowtorch for supplying a mixed gas of oxygen and $SiCl_4$ and a seven-layer gas flow path concentrically arranged outside the raw material supply pipe. Hydrogen, hydrogen, argon, oxygen, argon, hydrogen, and argon may sequentially enter the seven-layer gas flow path from the center to an outside of the first blowtorch. A flow rate of the oxygen entering the raw material supply pipe may be in a range of 13-15 L/min, and a flow rate of $SiCl_4$ may be in a range of 2-3 g/min; and flow rates of gases entering the seven-layer gas flow path may be sequentially in ranges of 0.2-0.5 L/min, 2-4 L/min, 2-3 L/min, 15-17 L/min, 3-4 L/min, 13-17 L/min, and 4-5 L/min from the center to the outside of the first blowtorch.

The second blowtorch may include a pipe located at a center of the second blowtorch for supplying hydrogen and a pipe for supplying oxygen arranged in a shape of a concentric circle outside the pipe for supplying the hydrogen.

The third blowtorch may include a raw material supply pipe located at a center of the third blowtorch for supplying a mixed gas of oxygen and $SiCl_4$ and a seven-layer gas flow path concentrically arranged outside the raw material supply pipe. Hydrogen, hydrogen, a mixed gas of argon and $CF_4$, oxygen, argon, hydrogen, and argon may sequentially enter the seven-layer gas flow path from the center to an outside of the third blowtorch. A flow rate of the oxygen entering the raw material supply pipe may be in a range of 25-27 L/min, a flow rate of $SiCl_4$ may be in a range of 15-25 g/min, and flow rates of gases entering the seven-layer gas flow path may be sequentially in ranges of 2-3 L/min, 3-5 L/min, 3-7 L/min, 35-40 L/min, 4-5 L/min, 35-45 L/min, and 6-7 L/min from the center to the outside of the third blowtorch, wherein the total flow rate of the mixed gas of argon and $CF_4$ may be in the range of 3-7 L/min, a flow rate of argon may be in a range of 2-3 L/min, and a flow rate of $CF_4$ may be in a range of 1-4 L/min.

The open deposition tip may be conical, a length of the deposition tip may be in a range of 20-22 mm, and a hole with a diameter in a range of 6-7 mm may be provided at the deposition tip. An inner diameter of the hollow tube body may be in a range of 30-31 mm, and an outer diameter of the hollow tube body may be in a range of 32-34 mm.

Preferably, the dehydration atmosphere may be composed of helium and chlorine, and in the dehydration atmosphere, a content of the chlorine may be in a range of 4% to 8%.

Preferably, a pressure at which the dehydration atmosphere enters the core layer loose body through the hollow glass tube may be in a range of 80-90 psi, and a pressure at which the dehydration atmosphere penetrates from an outside to an inside of the cladding layer loose body may be in a range of 35-45 psi.

Preferably, a dehydration temperature may be in a range of 1245-1255° C.; and dehydration time may be in a range of 2.5-3 hours.

Preferably, when the core rod loose body is manufactured, a top end of the hollow glass tube body may be sealed; and when the core rod loose body is dehydrated, the top end of the hollow glass tube body may be open.

Preferably, when the core rod loose body is manufactured, deposition may start on the hollow glass tube at a distance of 20 mm from a top end of the deposition tip.

Preferably, a deposition length of the core rod loose body manufactured by the VAD method may be in a range of 500-1100 mm, and a deposition speed of the core rod loose body may be in a range of 80-90 mm/h; and a diameter of the core layer loose body may be in a range of 23.8-24.3 mm, a thickness of the silicon dioxide isolation layer may be in a range of 0.8-1.2 mm, and a thickness of the cladding layer loose body may be in a range of 50-60 mm.

Preferably, a density of the core layer loose body may be in a range of 0.2-0.25 $g/cm^3$, a density of the silicon dioxide isolation layer may be in a range of 0.9-1.13 $g/cm^3$, and a density of the cladding layer loose body may be in a range of 0.28-0.33 $g/cm^3$.

Preferably, a furnace temperature of the drawing may be in a range of 1950-2050° C., tension of the drawing may be in a range of 100-230 g, a linear velocity of the drawing may be in a range of 980-1050 m/min, and a length of the optical fiber after being drawn may be in a range of 8-15 km.

This invention further provides an optical fiber manufactured by the above-mentioned manufacturing method, a loss of the optical fiber at a wavelength of 1550 nm is less than or equal to 0.172 dB/km, and a loss of the optical fiber at a wavelength of 1383 nm is less than or equal to 0.285 dB/km.

Compared with the prior art, this invention provides a manufacturing method for an optical fiber, including the following steps: A) using a hollow glass tube as a target rod, adopting the VAD method to manufacture a core rod loose body with a core layer loose body, a silicon dioxide isolation layer, and a cladding layer loose body sequentially arranged from inside out, and using a first blowtorch, a second blowtorch, and a third blowtorch for deposition, wherein gases entering the first blowtorch are $H_2$, $O_2$, Ar, and $SiCl_4$, and the core layer loose body is formed; gases entering the second blowtorch are $H_2$ and $O_2$, the silicon dioxide isolation layer is formed, a flow rate of $H_2$ entering the second blowtorch is in a range of 12-15 L/min, and a flow rate of $O_2$ entering the second blowtorch is in a range of 10-12 L/min; gases entering the third blowtorch are $H_2$, $O_2$, Ar, $SiCl_4$, and $CF_4$, and the cladding layer loose body is formed; and the hollow glass tube includes a hollow tube body and an open deposition tip communicating with a tail end of the hollow tube body, and the core layer loose body is connected with the deposition tip; B) dehydrating the core rod loose body, wherein a dehydration atmosphere enters the core layer loose body through the hollow glass tube and penetrates from an outside to an inside of the cladding layer loose body to obtain a dehydrated core rod loose body; C) sequentially sintering, extending, and washing corrosively the dehydrated core rod loose body and forming an outer cladding layer on a surface to obtain a preform; and D) drawing the preform to obtain an optical fiber with an ultra low loss.

In this invention, when the core layer loose body and the cladding layer loose body are deposited, the oxyhydrogen flame is used make a temperature of an interface between the core layer and the cladding layer rise, such that the silicon dioxide at the interface appropriately contracts to form the isolation layer with a relatively high density, and the isolation layer can effectively prevent the F element in the cladding layer from diffusing into the core loose body, so that a difference between a refractive index of the core layer and a refractive index of the cladding layer meets the requirement, thereby realizing the manufacturing of the ultra low attenuation optical fiber. In addition, in this invention, the hollow glass tube is used as the target rod, and the hollow glass tube which is the target rod is directly connected with the core layer loose body. During the subsequent dehydration, not only the dehydration atmosphere penetrates from the outside to the inside of the cladding layer loose body, but also the dehydration atmosphere directly enters the core layer through the hollow glass tube.

In this way, even if the outside dehydration atmosphere cannot penetrate into the core layer, hydroxyl groups in the core layer can be scavenged, thereby realizing a reduction of a water peak.

Results show that a loss of the optical fiber manufactured by this invention at the wavelength of 1550 nm is less than or equal to 0.172 dB/km, and a loss of the optical fiber at the wavelength of 1383 nm is less than or equal to 0.285 dB/km.

DETAILED DESCRIPTION OF THE EMBODIMENTS

This invention provides a manufacturing method for an optical fiber, including the following steps:

A) using a hollow glass tube as a target rod, adopting a vapor phase axial deposition (VAD) method to manufacture a core rod loose body with a core layer loose body, a silicon dioxide isolation layer, and a cladding layer loose body sequentially arranged from inside out, and using a first blowtorch, a second blowtorch, and a third blowtorch for deposition, wherein gases entering the first blowtorch are $H_2$, $O_2$, Ar, and $SiCl_4$, and the core layer loose body is formed; gases entering the second blowtorch are $H_2$ and $O_2$, the silicon dioxide isolation layer is formed, a flow rate of $H_2$ entering the second blowtorch is in a range of 12-15 L/min, and a flow rate of $O_2$ entering the second blowtorch is in a range of 10-12 L/min; gases entering the third blowtorch are $H_2$, $O_2$, Ar, $SiCl_4$, and $CF_4$, and the cladding layer loose body is formed; and the hollow glass tube includes a hollow tube body and an open deposition tip communicating with a tail end of the hollow tube body, and the core layer loose body is connected with the deposition tip;

B) dehydrating the core rod loose body, wherein a dehydration atmosphere enters the core layer loose body through the hollow glass tube and penetrates from an outside to an inside of the cladding layer loose body to obtain a dehydrated core rod loose body;

C) sequentially sintering, extending, and washing corrosively the dehydrated core rod loose body and forming an outer cladding layer on a surface to obtain a preform; and D) drawing the preform to obtain an optical fiber with an ultra low loss.

In this invention, the hollow glass tube is used as the target rod, and the VAD method is used to manufacture the core rod loose body with the core layer loose body, the silicon dioxide isolation layer, and the cladding layer loose body arranged sequentially from the inside to the outside.

The hollow glass tube includes the hollow tube body and the open deposition tip communicating with the tail end of the hollow tube body.

Preferably, the open deposition tip is conical, a length of the deposition tip is in a range of 20-22 mm, and a hole with a diameter in a range of 6-7 mm is provided at the deposition tip. An inner diameter of the hollow tube body of the hollow glass tube is in a range of 30-31 mm, and an outer diameter of the hollow tube body of the hollow glass tube is in a range of 32-34 mm.

Figure 1:
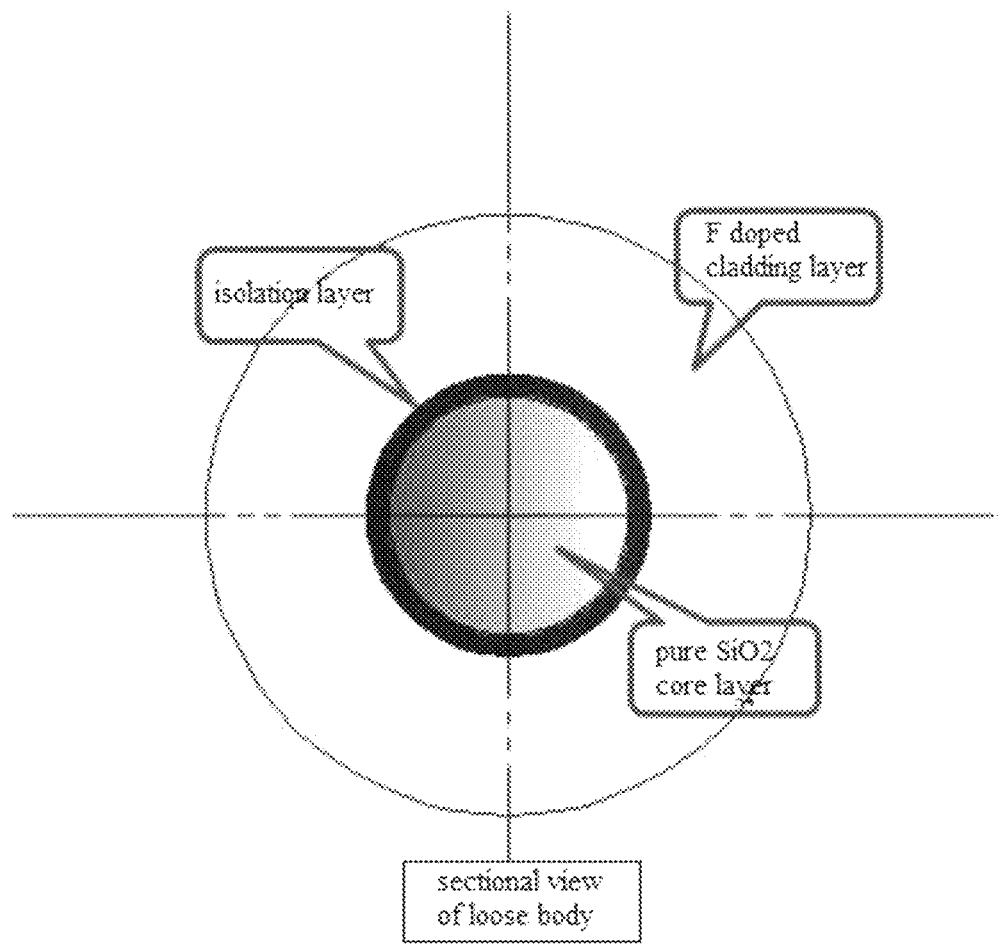
FIG. 1 is a sectional view of a core rod loose body of an optical fiber with an ultra low attenuation.
Figure 2:
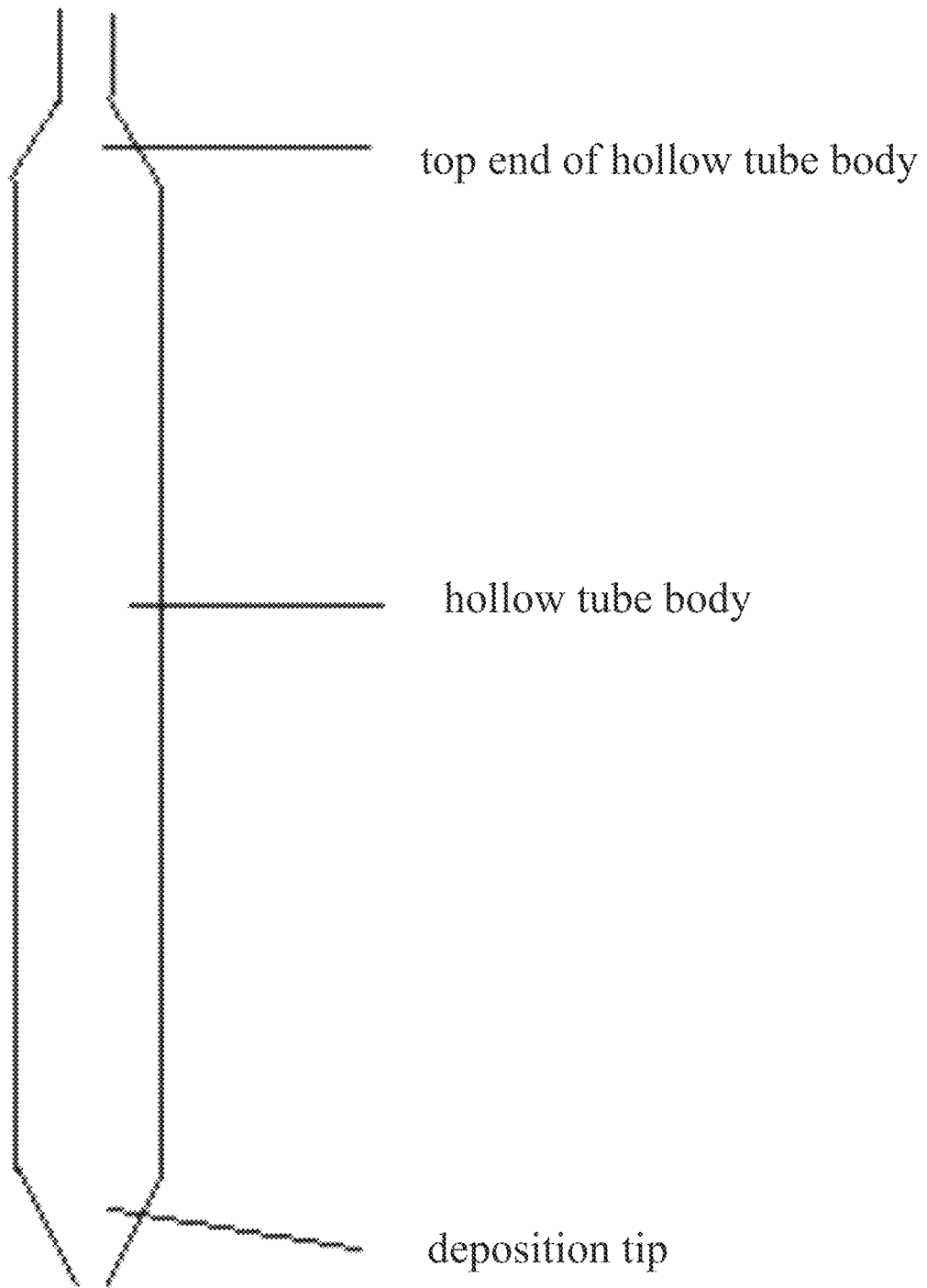
FIG. 2 is a structural schematic diagram of a hollow glass tube provided by this invention.

In this invention, a top end of the hollow tube body of the hollow glass tube is a connection end connected with a dehydration atmosphere pipe. Therefore, in order to facilitate matching with the size of the dehydration atmosphere pipe, a cross-sectional area of the top end of the hollow tube body is smaller than a cross-sectional area of the hollow tube body. Preferably, an outer diameter of the top end of the hollow tube body is reduced toward the direction of an end mouth. Please see FIG. 2, and FIG. 2 is a structural schematic diagram of the hollow glass tube provided by this invention.

A cross-sectional area of the tip of the hollow glass tube is smaller than the cross-sectional area of the hollow tube body. When the core rod loose body is manufactured, deposition starts on the hollow glass tube at a distance of 20 mm from a top end of the deposition tip. As the loose body grows slowly, the stacked loose body seals the hole of the deposition tip and surrounds the deposition tip in the core rod loose body.

In this invention, the VAD method is adopted to manufacture the core rod loose body, wherein a chamber of a device for manufacturing the core rod loose body by the VAD method is provided with the first blowtorch, the second blowtorch, and the third blowtorch. Preferably, the first blowtorch, the second blowtorch, and the third blowtorch are sequentially arranged from bottom to top.

The first blowtorch is used to deposite the core layer loose body, and gases entering the first blowtorch are $H_2$, $O_2$, Ar, and $SiCl_4$. The first blowtorch includes a raw material supply pipe located at a center of the first blowtorch for supplying a mixed gas of oxygen and $SiCl_4$ and a seven-layer gas flow path concentrically arranged outside the raw material supply pipe. Hydrogen, hydrogen, argon, oxygen, argon, hydrogen, and argon sequentially enter the seven-layer gas flow path from the center to the outside of the first blowtorch. A flow rate of the oxygen entering the raw material supply pipe is in a range of 13-15 L/min, and a flow rate of $SiCl_4$ is in a range of 2-3 g/min. Flow rates of gases entering the seven-layer gas flow path are sequentially in ranges of 0.2-0.5 L/min, 2-4 L/min, 2-3 L/min, 15-17 L/min, 3-4 L/min, 13-17 L/min, and 4-5 L/min from the center to the outside of the first blowtorch.

The second blowtorch is used to increase a surface temperature of the core layer loose body, wherein gases entering are $H_2$ and $O_2$. The second blowtorch includes a pipe located at a center of the second blowtorch for supplying hydrogen and a pipe for supplying oxygen arranged in a shape of a concentric circle outside the pipe for supplying the hydrogen. The second blowtorch is a key to form the isolation layer, an oxyhydrogen flame of the blowtorch two make a temperature of the formed core layer loose body rise. When a flow rate of the hydrogen in the second blowtorch is in a range of 12-15 L/min, preferably in a range of 13-14 L/min, and a flow rate of the oxygen is in a range of 10-12 L/min, preferably in a range of 10.5-11.5 L/min, the formed oxyhydrogen flame can increase the surface temperature of the core layer loose body to a range of 900-960° C. As the local temperature rises, $SiO_2$ particles on the surface of the core layer loose body begin to contract, and the core layer loose body contracts to form the silicon dioxide isolation layer on the surface. When a density of the isolation layer is greater than 0.85 $g/cm^3$, the cladding layer F can be effectively prevented from diffusing into the core layer.

The third blowtorch is used to deposite the cladding layer loose body, and gases entering the third blowtorch are $H_2$, $O_2$, Ar, $SiCl_4$, and $CF_4$. The third blowtorch includes a raw material supply pipe located at a center of the third blowtorch for supplying a mixed gas of oxygen and $SiCl_4$ and a seven-layer gas flow path concentrically arranged outside the raw material supply pipe. Hydrogen, hydrogen, a mixed gas of argon and $CF_4$, oxygen, argon, hydrogen, and argon sequentially enter the seven-layer gas flow path from the center to the outside of the third blowtorch. A flow rate of the oxygen entering the raw material supply pipe is in a range of 25-27 L/min, and a flow rate of $SiCl_4$ is in a range of 15-25 g/min. Flow rates of gases entering the seven-layer gas flow path are sequentially in ranges of 2-3 L/min, 3-5 L/min, 3-7 L/min, 35-40 L/min, 4-5 L/min, 35-45 L/min, and 6-7 L/min from the center to the outside of the third blowtorch, wherein the total flow rate of the mixed gas of argon and $CF_4$ is in the range of 3-7 L/min, a flow rate of the argon is in a range of 2-3 L/min, and a flow rate of $CF_4$ is in a range of 1-4 L/min.

The first blowtorch, the second blowtorch, and the third blowtorch are arranged from bottom to top in the chamber of the device for manufacturing the core rod loose body by VAD method, and the first blowtorch and the second blowtorch are arranged in parallel. According to the requirement for the size of an outer diameter of the core layer, an angle between the first blowtorch and the horizontal plane may be adjusted, preferably in a range of 38°-50°, more preferably in a range of 42°-46°, and an angle between the third blowtorch and the horizontal plane is in a range of 35°-45°, preferably in a range of 37°-41°.

The distance between a center point of a blowtorch mouth of the first blowtorch and a center point of a blowtorch mouth of the second blowtorch is in a range of 70-80 mm, preferably in a range of 73-77 mm. The distance between the center point of the blowtorch mouth of the second blowtorch and a center point of a blowtorch mouth of the third blowtorch is adjusted between 100-130 mm according to a thickness of the cladding layer, preferably in a range of 110-120 mm.

A flame length from the blowtorch mouth of the first blowtorch to the core rod loose body is in a range of 40-50 mm, preferably in a range of 43-47 mm; a flame length from the blowtorch mouth of the second blowtorch to the core rod loose body is in a range of 80-90 mm, preferably in a range of 83-87 mm; and a flame length from the blowtorch mouth of the third blowtorch to the core rod loose body is in a range of 120-160 mm, preferably in a range of 130-150 mm.

By adjusting positions of the three blowtorches and kinds and flow rates of gases entering the blowtorches, the core layer loose body with an original diameter of 25 mm is contracted to the core layer loose body with a diameter in a range of 23.8-24.3 mm, and the silicon dioxide isolation layer with a thickness of 0.8-1.2 mm is formed on the surface. Specifically, a deposition length of the core rod loose body manufactured by the VAD method is in a range of 500-1100 mm, the diameter of the core layer loose body is in a range of 23.8-24.3 mm, the thickness of the silicon dioxide isolation layer is in a range of 0.8-1.2 mm, and the thickness of the cladding layer loose body is in a range of 50-60 mm.

Figure 3:
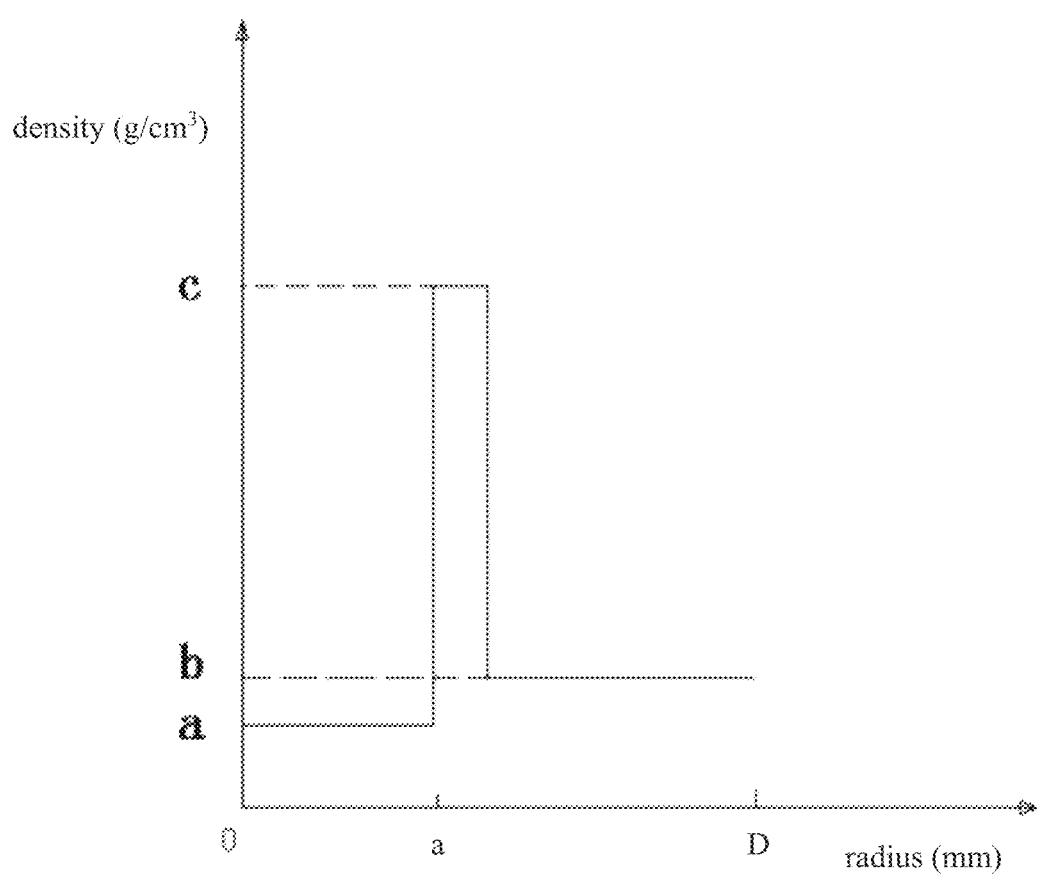
FIG. 3 is a schematic diagram of a density distribution of the core rod loose body manufactured by this invention.

A density of the core layer loose body is in a range of 0.2-0.25 $g/cm^3$, and a density of the cladding layer loose body is in a range of 0.28-0.33 $g/cm^3$. A density of the silicon dioxide isolation layer is in a range of 0.9-1.13 $g/cm^3$, preferably in a range of 0.95-1.05 $g/cm^3$. Experiments show that when the density of the isolation layer is greater than 0.85 $g/cm^3$, the cladding layer F can be effectively prevented from diffusing into the core layer. The formed silicon dioxide isolation layer grows together with the core layer and the cladding layer to obtain the core rod loose body including the silicon dioxide isolation layer. Please see FIG. 3, and FIG. 3 is a schematic diagram of a density distribution of the core rod loose body manufactured by this invention. In FIG. 3, a is the density of the core layer loose body, b is the density of the cladding layer loose body, and c is the density of the silicon dioxide isolation layer; and a is a radius of the core layer loose body, and D is a radius of the core rod loose body.

Finally, the obtained core rod loose body is the core layer loose body, the silicon dioxide isolation layer, and the cladding loose body from inside out.

Figure 4:
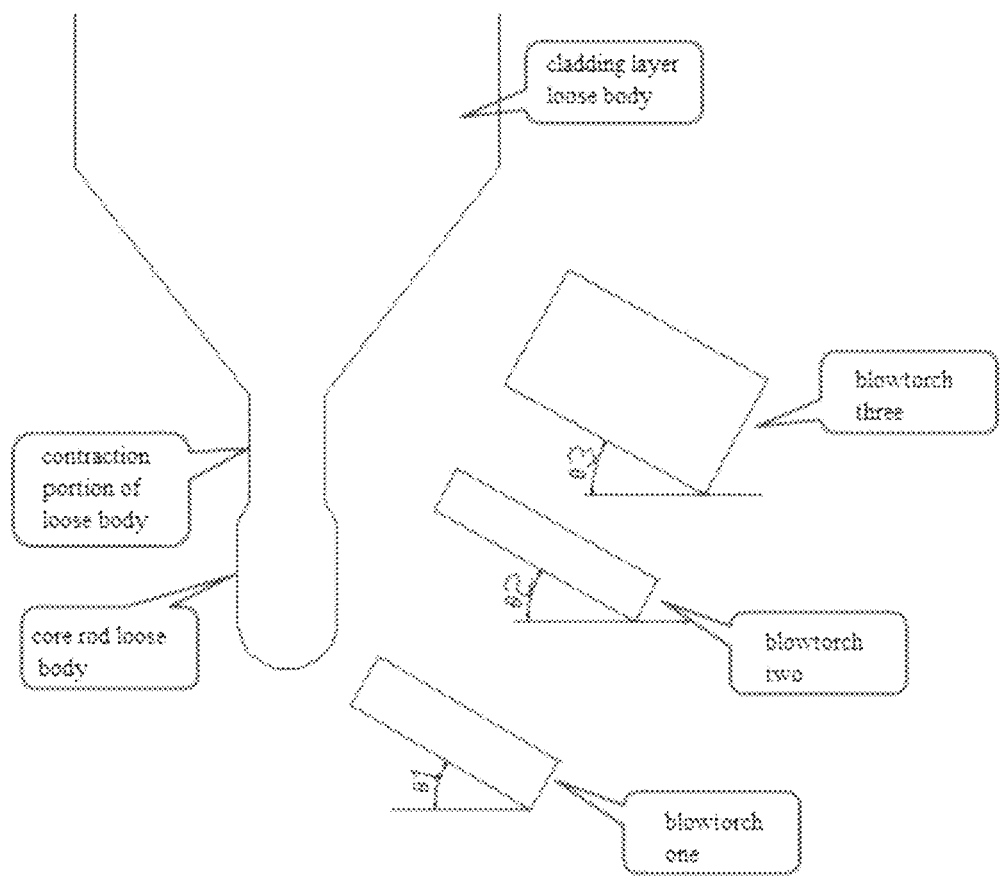
FIG. 4 is a schematic diagram of forming a silicon dioxide isolation layer during a process of manufacturing the core rod loose body by a vapor phase axial deposition (VAD) method.

Please see FIG. 4, and FIG. 4 is a schematic diagram of forming the silicon dioxide isolation layer during a process of manufacturing the core rod loose body by VAD method. In FIG. 4, blowertorch one is the first blowtorch, blowertorch two is the second blowtorch, and blowertorch three is the third blowtorch. θ1 is the angle between the first blowtorch and the horizontal plane, θ2 is an angle between the second blowtorch and the horizontal plane, and θ3 is the angle between the third blowtorch and the horizontal plane. The oxyhydrogen flame of the second blowtorch is used to make the temperature of the formed core layer loose body rise. As the local temperature rises, $SiO_2$ particles on the surface of the core layer loose body begin to contract, and the core layer loose body contracts to form the silicon dioxide isolation layer on the surface.

In this invention, a deposition speed of the core rod loose body affects a density of the core rod loose body, thereby affecting a subsequent dehydration effect of the core rod loose body. Therefore, in this invention, the deposition speed of the core rod loose body is in a range of 80-90 mm/h, and a manufacturing process temperature of the core rod loose body is in a range of 750-1000° C.

The deposition length of the core rod loose body is in a range of 500-1100 mm, wherein the core layer loose body is connected with the deposition tip of the hollow glass tube.

In addition, in order to ensure a deposition speed and a quality, when the core rod loose body is manufactured, the top end of the hollow glass tube body is sealed. In this invention, there are no special restrictions on the sealing way, in order to ensure the recycling of the hollow glass tube, it is preferred to seal the top end of the hollow glass tube with a sealing cover.

Figure 5:
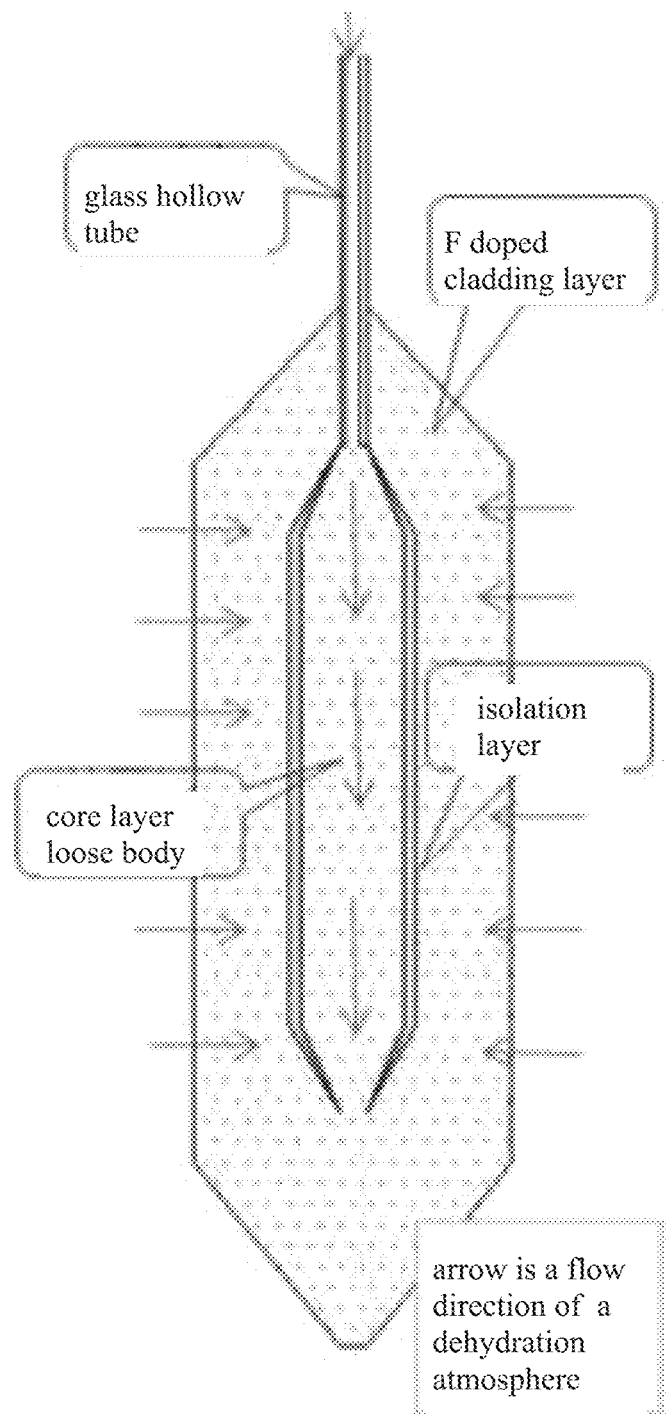
FIG. 5 is a schematic diagram of a process of dehydrating the core rod loose body according to this invention.

After the core rod loose body is obtained, the core rod loose body is dehydrated, and during the dehydration, the top end of the hollow glass tube body is open, that is, the sealing cover is removed. Please see FIG. 5, and FIG. 5 is a schematic diagram of a process of dehydrating the core rod loose body according to this invention. As shown in FIG. 5, the dehydration atmosphere enters the core layer loose body through the hollow glass tube and penetrates from the outside to the inside of the cladding loose body, and a dehydrated core rod loose body is obtained.

The dehydration atmosphere is composed of helium and chlorine, and in the dehydration atmosphere, a content of the chlorine is in a range of 4%-8%, preferably in a range of 5%-7%. A pressure at which the dehydration atmosphere enters the core layer loose body through the hollow glass tube is in a range of 80-90 psi, preferably in a range of 83-87 psi. A pressure at which the dehydration atmosphere penetrates from the outside to the inside of the cladding layer loose body is in a range of 35-45 psi, preferably in a range of 38-42 psi.

A dehydration temperature is in a range of 1245-1255° C., preferably in a range of 1248-1252° C.; and dehydration time is in a range of 2.5-3 hours.

After the dehydration is completed, the dehydrated core rod loose body is sequentially sintered, extended, washed corrosively, and the outer cladding layer is formed on the surface to obtain the preform.

By using the isolation effect of the silicon dioxide isolation layer to cladding layer F, a refractive index of the cladding layer can be reduced while a refractive index of the pure $SiO_2$ in the core layer is well maintained.

Figure 6:
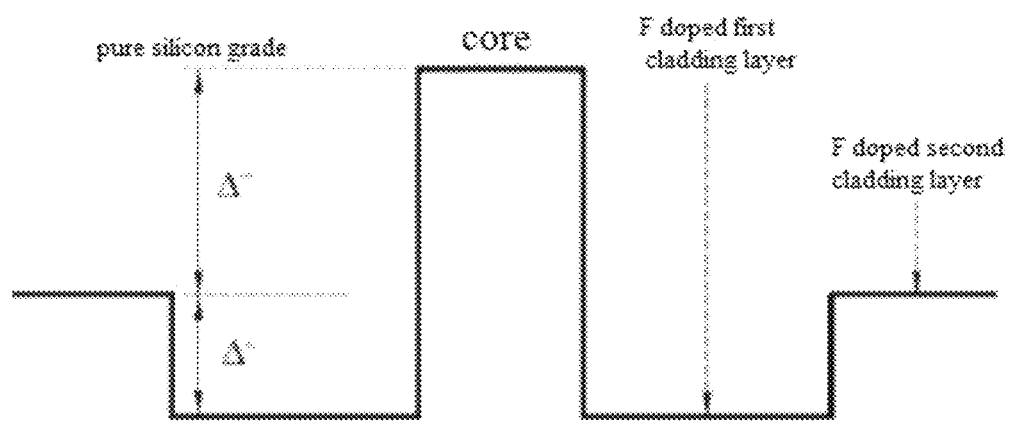
FIG. 6 is a schematic diagram of a refractive index distribution of a preform.

Please see FIG. 6, and FIG. 6 is a schematic diagram of a refractive index distribution of the preform. The core is manufactured from the core layer loose body and the silicon dioxide isolation layer in the core rod loose body and has a relatively high refractive index. An F doped first cladding layer is manufactured from the cladding layer loose body in the core rod loose body, and a refractive index of the F doped first cladding layer is relatively low. An F doped second cladding layer is the outer cladding layer, and a refractive index thereof is between the refractive index of the core and the refractive index of the F doped first cladding layer. $\Delta^-$ is a difference between the refractive index of the core and the refractive index of the F doped second cladding layer, and $\Delta'$ is a difference between the refractive index of the F doped second cladding layer and the refractive index of the F doped first cladding layer.

The refractive index of the core layer is 1.4572, the refractive index of the F doped first cladding layer is in a range of 1.45195-1.45283, and the difference between the refractive index of the core and the refractive index of the F doped first cladding layer $\Delta=-0.3\%$--0.36%.

Finally, the obtained preform is drawn to obtain the ultra low loss optical fiber.

A furnace temperature of the drawing is in a range of 1950-2050° C., tension of the drawing is in a range of 100-230 g, a linear velocity of the drawing is in a range of 980-1050 m/min, and a length of the optical fiber after being drawn is in a range of 8-15 km.

This invention also provides an optical fiber manufactured by the above-mentioned manufacturing method. A loss of the optical fiber at the wavelength of 1550 nm is no more than 0.172 dB/km, and a loss of the optical fiber at the wavelength of 1383 nm is no more than 0.285 dB/km.

In this invention, when the core layer loose body and the cladding layer loose body are deposited, the oxyhydrogen flame is used make a temperature of an interface between the core layer and the cladding layer rise, such that the silicon dioxide at the interface appropriately contracts to form the isolation layer with a relatively high density, and the isolation layer can effectively prevent the F element in the cladding layer from diffusing into the core loose body, so that the difference between the refractive index of the core layer and the refractive index of the cladding layer meets the requirement, thereby realizing the manufacturing of the optical fiber with the ultra low attenuation. In addition, in this invention, the hollow glass tube is used as the target rod, and the hollow glass tube which is the target rod is directly connected with the core layer loose body. During the subsequent dehydration, not only the dehydration atmosphere penetrates from the outside to the inside of the cladding layer loose body, but also the dehydration atmosphere directly enters the core layer through the hollow glass tube. In this way, even if the outside dehydration atmosphere cannot penetrate into the core layer, hydroxyl groups in the core layer can be scavenged, thereby realizing a reduction of the water peak.

Results show that the loss of the optical fiber manufactured by this invention at the wavelength of 1550 nm is less than or equal to 0.172 dB/km, and the loss of the optical fiber at the wavelength of 1383 nm is less than or equal to 0.285 dB/km.

In order to further understand this invention, the optical fiber and the manufacturing method thereof provided by this invention will be described below in combination with embodiments, and the protection scope of this invention is not limited by the following embodiments.

Embodiment One

A hollow glass tube is used as a target rod, and VAD method is adopted to manufacture a core rod loose body with a core layer loose body, a silicon dioxide isolation layer, and a cladding layer loose body arranged sequentially from inside out.

As shown in FIG. 2, the hollow glass tube includes a hollow tube body and an open deposition tip communicating with the tail end of the hollow tube body. The open deposition tip is conical, a length of the deposition tip is 20 mm, and a hole with a diameter of 6 mm is provided at the deposition tip. An inner diameter of the hollow tube body of the hollow glass tube is 30 mm, and an outer diameter of the hollow tube body of the hollow glass tube is 32 mm.

A chamber of a device for manufacturing the core rod loose body by VAD method is provided with a first blowtorch, a second blowtorch, and a third blowtorch sequentially arranged from bottom to top.

Gases entering the first blowtorch are $H_2$, $O_2$, Ar, and $SiCl_4$. The first blowtorch includes a raw material supply pipe located at a center of the first blowtorch for supplying a mixed gas of oxygen (shown by O1) and $SiCl_4$ and a seven-layer gas flow path concentrically arranged outside the raw material supply pipe. Hydrogen (shown by H1), hydrogen (shown by H2), argon (shown by Ar1), oxygen (shown by O2), argon (shown by Ar2), hydrogen (shown by H3), and argon (shown by Ar3) sequentially enter the seven-layer gas flow path from the center to the outside of the first blowtorch. Flow rates of $H_2$ entering the first blowtorch for depositing the core layer loose body are H1:

0.25 L/min, H2: 3 L/min, and H3: 15 L/min, flow rates of $O_2$ are O1: 13.5 L/min and O2: 15.5 L/min, flow rates of Ar are Ar1: 2.5 L/min, Ar2: 3 L/min, and Ar 3: 4 L/min, and a flow rate of $SiCl_4$ is 2.1 g/min. The core layer loose body is obtained by deposition.

The second blowtorch includes a pipe located at a center of the second blowtorch for supplying hydrogen and a pipe for supplying oxygen arranged in a shape of a concentric circle outside the pipe for supplying the hydrogen. A flow rate of $H_2$ entering the second blowtorch used for manufacturing the silicon dioxide isolation layer is 12 L/min, a flow rate of $O_2$ is 10 L/min, and the silicon dioxide isolation layer is obtained.

The third blowtorch includes a raw material supply pipe located at a center of the third blowtorch for supplying a mixed gas of oxygen (shown by O3) and $SiCl_4$ and a seven-layer gas flow path concentrically arranged outside the raw material supply pipe. Hydrogen (shown by H4), hydrogen (shown by H5), a mixed gas of argon (shown by Ar4) and $CF_4$, oxygen (shown by O4), argon (shown by Ar5), hydrogen (shown by H6), and argon (shown by Ar6) sequentially enter the seven-layer gas flow path from the center to the outside of the third blowtorch. Flow rates of $H_2$ entering the third blowtorch for depositing the cladding layer loose body are H4: 2.5 L/min, H5: 3.5 L/min, and H6: 35 L/min, flow rates of $O_2$ are O3: 26 L/min and O4: 36 L/min, flow rates of Ar are Ar4: 2.5 L/min, Ar5: 4 L/min, and Ar6: 6 L/min, a flow rate of $SiCl_4$ is 18 g/min, and a flow rate of $CF_4$ is 1.5 L/min. The cladding layer loose body is obtained by deposition.

A flame length from a blowtorch mouth of the first blowtorch to the core rod loose body is 45 mm; a flame length from a blowtorch mouth of the second blowtorch to the core rod loose body is 85 mm; and a flame length from a blowtorch mouth of the third blowtorch to the core rod loose body is 135 mm.

A distance between a center point of the blowtorch mouth of the first blowtorch and a center point of the blowtorch mouth of the second blowtorch is 70 mm, and a distance between the center point of the blowtorch mouth of the second blowtorch and a center point of the blowtorch mouth of the third blowtorch is 120 mm.

After parameters of the three blowtorches are set, blowtorches are ignited to deposit the core rod loose body. The oxyhydrogen flame of the second blowtorch is used to increase the temperature of the formed core layer loose body to a range of 900-1000° C. As the local temperature rises, $SiO_2$ particles on the surface of the core layer loose body begin to contract, the core layer loose body contracts to form the silicon dioxide isolation layer on the surface, and the core rod loose body with the core layer loose body, the silicon dioxide isolation layer, and the cladding layer loose body sequentially arranged from the inside to the outside is obtained.

When the core rod loose body is manufactured, deposition starts on the hollow glass tube at a distance of 20 mm from a top end of the deposition tip. A deposition length of the core rod loose body is 800 mm. A diameter of the core layer loose body is 23.9 mm, a thickness of the silicon dioxide isolation layer is 0.85 mm, and a thickness of the cladding layer loose body is 58 mm. A density of the core layer loose body is 0.22 $g/cm^3$, a density of the silicon dioxide isolation layer is 0.95 $g/cm^3$, and a density of the cladding layer loose body is 0.3 $g/cm^3$.

A deposition speed of the core rod loose body is 80 mm/h. A process temperature is 980° C. Finally, the core rod loose body with a length of 800 mm is obtained.

When the core rod loose body is manufactured, a sealing cover is used to seal the top end of the hollow glass tube body. The core layer loose body of the finally obtained core rod loose body is connected with the deposition tip.

After the core rod loose body is obtained, the core rod loose body is dehydrated, and during the dehydration, the sealing cover at the top end of the hollow glass tube body is removed. The dehydration atmosphere enters the core layer loose body through the hollow glass tube and penetrates from the outside to the inside of the cladding loose body. The dehydration atmosphere is composed of helium and chlorine, and in the dehydration atmosphere, a content of the chlorine is 4%. A pressure at which the dehydration atmosphere enters the core layer loose body through the hollow glass tube is 80 psi; and a pressure at which the dehydration atmosphere penetrates from the outside to the inside of the cladding layer loose body is 35 psi. A dehydration temperature is 1250° C.; and dehydration time is 2.5 hours. Finally, the dehydrated core rod loose body is obtained.

After the dehydration is completed, the dehydrated core rod loose body is sequentially sintered, extended, and washed corrosively, and an outer cladding layer is formed on the surface to obtain a preform.

After measuring, a refractive index of the core layer of the preform is 1.4572, a refractive index of an F doped first cladding layer is 1.45282, and a difference between the refractive index of the core layer and the refractive index of the F doped first cladding layer $\Delta=-0.3\%$.

Next, the preform is drawn to obtain the optical fiber. A furnace temperature of the drawing is 2050° C., tension of the drawing is 115 g, a linear velocity of the drawing is 1000 m/min, and a length of the optical fiber after being drawn is 10 km. Optical fibers are obtained, and performance of the optical fibers is measured. Results are shown in Table 1, and Table 1 shows performance test results of optical fibers manufactured in embodiments 1 to 5.

TABLE 1 performance test results of optical fibers manufactured in embodiments 1 to 5

| Embodiment | Cut-off wavelength (um) | Mode field diameter (um) | Core diameter (um) | F diameter (um) | 1550 nm loss (dB/km) | 1383 nm loss (dB/km) | Dispersion (ps/nm/km) | Dispersion slope (ps/nm²/km) | Bending loss (dB/km) | Effective area (um²) |
|---|---|---|---|---|---|---|---|---|---|---|
| Embodiment One | 1.519 | 11.5 | 8.61 | 124.97 | 0.172 | 0.285 | 20.41 | 0.049 | 2.7 | 113 |
| Embodiment Two | 1.47 | 11.45 | 8.72 | 125.1 | 0.169 | 0.277 | 20.35 | 0.05 | 2.6 | 111 |
| Embodiment Three | 1.401 | 11.7 | 8.92 | 125.15 | 0.169 | 0.283 | 20.4 | 0.05 | 2.5 | 112 |
| Embodiment Four | 1.398 | 11.8 | 8.89 | 124.95 | 0.171 | 0.28 | 20.38 | 0.048 | 2.8 | 113.5 |

TABLE 1-continued performance test results of optical fibers manufactured in embodiments 1 to 5

| Embodiment | Cut-off wavelength (um) | Mode field diameter (um) | Core diameter (um) | F diameter (um) | 1550 nm loss (dB/km) | 1383 nm loss (dB/km) | Dispersion (ps/nm/km) | Dispersion slope (ps/nm²/km) | Bending loss (dB/km) | Effective area (um²) |
|---|---|---|---|---|---|---|---|---|---|---|
| Embodiment Five | 1.37 | 11.75 | 8.85 | 125.25 | 0.168 | 0.275 | 20.42 | 0.051 | 2.45 | 112 |

Comparative Embodiment One

The optical fiber is manufactured in accordance with process parameters of Embodiment One, except that a solid glass target rod is used instead of the hollow glass tube in the embodiment. Performance of the optical fibers is measured. Results are shown in Table 2, and Table 2 shows performance test results of optical fibers manufactured in comparative embodiments 1 to 5.

TABLE 2 performance test results of optical fibers manufactured in comparative embodiments 1 to 5

| Comparative Embodiment | Cut-off wavelength (um) | Mode field diameter (um) | Core diameter (um) | F diameter turn) | 1550 nm loss (dB/km) | 1383 nm loss (dB/km) | Dispersion (ps/nm/km) | Dispersion slope (ps/nm²/km) | Bending loss (dB/km) | Effective area (um²) |
|---|---|---|---|---|---|---|---|---|---|---|
| Comparative Embodiment One | 1.48 | 11.8 | 8.9 | 124.95 | 0.173 | 2.75 | 20.38 | 0.047 | 2.39 | 110.5 |
| Comparative Embodiment Two | 1.44 | 11.75 | 8.89 | 125.3 | 0.169 0.170 | 2.33 | 20.44 | 0 051 | 2.66 | 113 |
| Comparative Embodiment Three | 1.401 | 11.7 | 8.85 | 124.97 | 0.165 | 2.05 | 20.39 | 0.047 | 2.51 | 112.8 |
| Comparative Embodiment Four | 1.39 | 11.45 | 8.61 | 125.25 | 0.171 | 2.48 | 20.36 | 0.052 | 2.78 | 112 |
| Comparative Embodiment Five | 1.37 | 11.66 | 8.72 | 125.1 | 0.166 | 2.54 | 20.40 | 0.048 | 2.69 | 113 |

Embodiment Two

A hollow glass tube is used as a target rod, and VAD method is adopted to manufacture a core rod loose body with a core layer loose body, a silicon dioxide isolation layer, and a cladding layer loose body arranged sequentially from inside out. As shown in FIG. 2, the hollow glass tube includes a hollow tube body and an open deposition tip communicating with the tail end of the hollow tube body. The open deposition tip is conical, a length of the deposition tip is 20 mm, and a hole with a diameter of 6 mm is provided at the deposition tip. An inner diameter of the hollow tube body of the hollow glass tube is 30 mm, and an outer diameter of the hollow tube body of the hollow glass tube is 32 mm.

A chamber of a device for manufacturing the core rod loose body by VAD method is provided with a first blowtorch, a second blowtorch, and a third blowtorch sequentially arranged from bottom to top.

Gases entering the first blowtorch are $H_2$, $O_2$, Ar, and $SiCl_4$. The first blowtorch includes a raw material supply pipe located at a center of the first blowtorch for supplying a mixed gas of oxygen (shown by O1) and $SiCl_4$ and a seven-layer gas flow path concentrically arranged outside the raw material supply pipe. Hydrogen (shown by H1), hydrogen (shown by H2), argon (shown by Ar1), oxygen (shown by O2), argon (shown by Ar2), hydrogen (shown by H3), and argon (shown by Ar3) sequentially enter the seven-layer gas flow path from the center to the outside of the first blowtorch. Flow rates of $H_2$ entering the first blowtorch for depositing the core layer loose body are H1: 0.25 L/min, H2: 3 L/min, and H3: 15 L/min, flow rates of $O_2$ are O1: 13.5 L/min and O2: 15.5 L/min, flow rates of Ar are Ar1: 2.5 L/min, Ar2: 3 L/min, and Ar3: 4 L/min, and a flow rate of $SiCl_4$ is 2.1 g/min. The core layer loose body is obtained by deposition.

The second blowtorch includes a pipe located at a center of the second blowtorch for supplying hydrogen and a pipe for supplying oxygen arranged in a shape of a concentric circle outside the pipe for supplying the hydrogen. A flow rate of $H_2$ entering the second blowtorch used for manufacturing the silicon dioxide isolation layer is 13 L/min, a flow rate of $O_2$ is 11 L/min, and the silicon dioxide isolation layer is obtained.

The third blowtorch includes a raw material supply pipe located at a center of the third blowtorch for supplying a mixed gas of oxygen (shown by O3) and $SiCl_4$ and a seven-layer gas flow path concentrically arranged outside the raw material supply pipe. Hydrogen (shown by H4), hydrogen (shown by H5), a mixed gas of argon (shown by Ar4) and $CF_4$, oxygen (shown by O4), argon (shown by Ar5), hydrogen (shown by H6), and argon (shown by Ar6) sequentially enter the seven-layer gas flow path from the center to the outside of the third blowtorch. Flow rates of $H_2$ entering the third blowtorch for depositing the cladding layer loose body are H4: 2.5 L/min, H5: 3.5 L/min, and H6: 35 L/min, flow rates of $O_2$ are O3: 26 L/min and O4: 36

L/min, flow rates of Ar are Ar4: 2.5 L/min, Ar5: 4 L/min, and Ar6: 6 L/min, a flow rate of $SiCl_4$ is 18 g/min, and a flow rate of $CF_4$ is 2.5 L/min. The cladding layer loose body is obtained by deposition.

A flame length from a blowtorch mouth of the first blowtorch to the core rod loose body is 45 mm; a flame length from a blowtorch mouth of the second blowtorch to the core rod loose body is 85 mm; and a flame length from a blowtorch mouth of the third blowtorch to the core rod loose body is 135 mm.

A distance between a center point of the blowtorch mouth of the first blowtorch and a center point of the blowtorch mouth of the second blowtorch is 70 mm, and a distance between the center point of the blowtorch mouth of the second blowtorch and a center point of the blowtorch mouth of the third blowtorch is 120 mm.

After parameters of the three blowtorches are set, blowtorches are ignited to deposit the core rod loose body. The oxyhydrogen flame of the second blowtorch is used to increase the temperature of the formed core layer loose body to a range of 900-1000° C. As the local temperature rises, $SiO_2$ particles on the surface of the core layer loose body begin to contract, the core layer loose body contracts to form the silicon dioxide isolation layer on the surface, and the core rod loose body with the core layer loose body, the silicon dioxide isolation layer, and the cladding layer loose body sequentially arranged from the inside to the outside is obtained.

When the core rod loose body is manufactured, deposition starts on the hollow glass tube at a distance of 20 mm from a top end of the deposition tip. A deposition length of the core rod loose body is 800 mm. A diameter of the core layer loose body is 24 mm, a thickness of the silicon dioxide isolation layer is 1.05 mm, and a thickness of the cladding layer loose body is 58 mm. A density of the core layer loose body is 0.223 $g/cm^3$, a density of the silicon dioxide isolation layer is 1.02 $g/cm^3$, and a density of the cladding layer loose body is 0.31 $g/cm^3$.

A deposition speed of the core rod loose body is 80 mm/h. A process temperature is 980° C. Finally, the core rod loose body with a length of 800 mm is obtained.

When the core rod loose body is manufactured, a sealing cover is used to seal the top end of the hollow glass tube body. The core layer loose body of the finally obtained core rod loose body is connected with the deposition tip.

After the core rod loose body is obtained, the core rod loose body is dehydrated, and during the dehydration, the sealing cover at the top end of the hollow glass tube body is removed. The dehydration atmosphere enters the core layer loose body through the hollow glass tube and penetrates from the outside to the inside of the cladding loose body. The dehydration atmosphere is composed of helium and chlorine, and in the dehydration atmosphere, a content of the chlorine is 5%. A pressure at which the dehydration atmosphere enters the core layer loose body through the hollow glass tube is 82 psi; and a pressure at which the dehydration atmosphere penetrates from the outside to the inside of the cladding layer loose body is 38 psi. A dehydration temperature is 1250° C.; and dehydration time is 2.5 hours. Finally, the dehydrated core rod loose body is obtained.

After the dehydration is completed, the dehydrated core rod loose body is sequentially sintered, extended, and washed corrosively, and an outer cladding layer is formed on the surface to obtain a preform.

After measuring, a refractive index of the core layer of the preform is 1.4572, a refractive index of an F doped first cladding layer is 1.45224, and $\Delta$=−0.34%.

Next, the preform is drawn to obtain the optical fiber. A furnace temperature of the drawing is 2000° C., tension of the drawing is 150 g, a linear velocity of the drawing is 1000 m/min, and a length of the optical fiber after being drawn is 14 km. The optical fiber is obtained, and performance of the optical fibers is measured. Results are shown in Table 1, and Table 1 shows performance test results of optical fibers manufactured in embodiments 1 to 5.

Comparative Embodiment Two

The optical fiber is manufactured in accordance with process parameters of Embodiment Two, except that a solid glass target rod is used instead of the hollow glass tube in the embodiment. Performance of the optical fibers is measured. Results are shown in Table 2, and Table 2 shows performance test results of optical fibers manufactured in comparative embodiments 1 to 5.

Embodiment 3

A hollow glass tube is used as a target rod, and VAD method is adopted to manufacture a core rod loose body with a core layer loose body, a silicon dioxide isolation layer, and a cladding layer loose body arranged sequentially from inside out. As shown in FIG. 2, the hollow glass tube includes a hollow tube body and an open deposition tip communicating with the tail end of the hollow tube body. The open deposition tip is conical, a length of the deposition tip is 20 mm, and a hole with a diameter of 6 mm is provided at the deposition tip. An inner diameter of the hollow tube body of the hollow glass tube is 30 mm, and an outer diameter of the hollow tube body of the hollow glass tube is 32 mm.

A chamber of a device for manufacturing the core rod loose body by VAD method is provided with a first blowtorch, a second blowtorch, and a third blowtorch sequentially arranged from bottom to top.

Gases entering the first blowtorch are $H_2$, $O_2$, Ar, and $SiCl_4$. The first blowtorch includes a raw material supply pipe located at a center of the first blowtorch for supplying a mixed gas of oxygen (shown by O1) and $SiCl_4$ and a seven-layer gas flow path concentrically arranged outside the raw material supply pipe. Hydrogen (shown by H1), hydrogen (shown by H2), argon (shown by Ar1), oxygen (shown by O2), argon (shown by Ar2), hydrogen (shown by H3), and argon (shown by Ar3) sequentially enter the seven-layer gas flow path from the center to the outside of the first blowtorch. Flow rates of $H_2$ entering the first blowtorch for depositing the core layer loose body are H1: 0.25 L/min, H2: 3 L/min, and H3: 15 L/min, flow rates of $O_2$ are O1: 13.5 L/min and O2: 15.5 L/min, flow rates of Ar are Ar1: 2.5 L/min, Ar2: 3 L/min, and Ar3: 4 L/min, and a flow rate of $SiCl_4$ is 2.1 g/min. The core layer loose body is obtained by deposition.

The second blowtorch includes a pipe located at a center of the second blowtorch for supplying hydrogen and a pipe for supplying oxygen arranged in a shape of a concentric circle outside the pipe for supplying the hydrogen. A flow rate of $H_2$ entering the second blowtorch used for manufacturing the silicon dioxide isolation layer is 15 L/min, a flow rate of $O_2$ is 12 L/min, and the silicon dioxide isolation layer is obtained.

The third blowtorch includes a raw material supply pipe located at a center of the third blowtorch for supplying a mixed gas of oxygen (shown by O3) and $SiCl_4$ and a seven-layer gas flow path concentrically arranged outside the raw material supply pipe. Hydrogen (shown by H4), hydrogen (shown by H5), a mixed gas of argon (shown by Ar4) and $CF_4$, oxygen (shown by O4), argon (shown by Ar5), hydrogen (shown by H6), and argon (shown by Ar6) sequentially enter the seven-layer gas flow path from the center to the outside of the third blowtorch. Flow rates of $H_2$ entering the third blowtorch for depositing the cladding layer loose body are H4: 2.5 L/min, H5: 3.5 L/min, and H6: 35 L/min, flow rates of $O_2$ are O3: 26 L/min and O4: 36 L/min, flow rates of Ar are Ar4: 2.5 L/min, Ar5: 4 L/min, and Ar6: 6 L/min, a flow rate of $SiCl_4$ is 18 g/min, and a flow rate of $CF_4$ is 4 L/min. The cladding layer loose body is obtained by deposition.

A flame length from a blowtorch mouth of the first blowtorch to the core rod loose body is 45 mm; a flame length from a blowtorch mouth of the second blowtorch to the core rod loose body is 85 mm; and a flame length from a blowtorch mouth of the third blowtorch to the core rod loose body is 135 mm.

A distance between a center point of the blowtorch mouth of the first blowtorch and a center point of the blowtorch mouth of the second blowtorch is 70 mm, and a distance between the center point of the blowtorch mouth of the second blowtorch and a center point of the blowtorch mouth of the third blowtorch is 120 mm.

After parameters of the three blowtorches are set, blowtorches are ignited to deposit the core rod loose body. The oxyhydrogen flame of the second blowtorch is used to increase the temperature of the formed core layer loose body to a range of 900-1000° C. As the local temperature rises, $SiO_2$ particles on the surface of the core layer loose body begin to contract, and the core layer loose body contracts to form the silicon dioxide isolation layer on the surface, and the core rod loose body with the core layer loose body, the silicon dioxide isolation layer, and the cladding layer loose body sequentially arranged from the inside to the outside is obtained.

When the core rod loose body is manufactured, deposition starts on the hollow glass tube at a distance of 20 mm from a top end of the deposition tip. A deposition length of the core rod loose body is 1000 mm, a diameter of the core layer loose body is 24 mm, a thickness of the silicon dioxide isolation layer is 1.15 mm, and a thickness of the cladding layer loose body is 58 mm. A density of the core layer loose body is 0.22 g/cm$^3$, a density of the silicon dioxide isolation layer is 1.13 g/cm$^3$, and a density of the cladding layer loose body is 0.29 g/cm$^3$.

A deposition speed of the core rod loose body is 80 mm/h. A process temperature is 980° C. Finally, the core rod loose body with a length of 1000 mm is obtained.

When the core rod loose body is manufactured, a sealing cover is used to seal the top end of the hollow glass tube body. The core layer loose body of the finally obtained core rod loose body is connected with the deposition tip. After the core rod loose body is obtained, the core rod loose body is dehydrated, and during the dehydration, the sealing cover at the top end of the hollow glass tube body is removed. The dehydration atmosphere enters the core layer loose body through the hollow glass tube and penetrates from the outside to the inside of the cladding loose body. The dehydration atmosphere is composed of helium and chlorine, and in the dehydration atmosphere, a content of the chlorine is 6%. A pressure at which the dehydration atmosphere enters the core layer loose body through the hollow glass tube is 85 psi; and a pressure at which the dehydration atmosphere penetrates from the outside to the inside of the cladding layer loose body is 40 psi. A dehydration temperature is 1250° C.; and dehydration time is 2.5 hours. Finally, the dehydrated core rod loose body is obtained.

After the dehydration is completed, the dehydrated core rod loose body is sequentially sintered, extended, and washed corrosively, and an outer cladding layer is formed on the surface to obtain a preform.

After measuring, a refractive index of the core layer of the preform is 1.4572, a refractive index of an F doped first cladding layer is 1.45195, and Δ=−0.36%.

Next, the preform is drawn to obtain the optical fiber. A furnace temperature of the drawing is 1987° C., tension of the drawing is 200 g, a linear velocity of the drawing is 1000 m/min, and a length of the optical fiber after being drawn is 15 km. The optical fiber is obtained, and performance of the optical fibers is measured. Results are shown in Table 1, and Table 1 shows performance test results of optical fibers manufactured in embodiments 1 to 5.

Comparative Embodiment Three

The optical fiber is manufactured in accordance with process parameters of Embodiment Three, except that a solid glass target rod is used instead of the hollow glass tube in the embodiment. Performance of the optical fibers is measured. Results are shown in Table 2, and Table 2 shows performance test results of optical fibers manufactured in comparative embodiments 1 to 5.

Embodiment Four

A hollow glass tube is used as a target rod, and VAD method is adopted to manufacture a core rod loose body with a core layer loose body, a silicon dioxide isolation layer, and a cladding layer loose body arranged sequentially from inside out. As shown in FIG. 2, the hollow glass tube includes a hollow tube body and an open deposition tip communicating with the tail end of the hollow tube body. The open deposition tip is conical, a length of the deposition tip is 20 mm, and a hole with a diameter of 6 mm is provided at the deposition tip. An inner diameter of the hollow tube body of the hollow glass tube is 30 mm, and an outer diameter of the hollow tube body of the hollow glass tube is 32 mm.

A chamber of a device for manufacturing the core rod loose body by VAD method is provided with a first blowtorch, a second blowtorch, and a third blowtorch sequentially arranged from bottom to top.

Gases entering the first blowtorch are $H_2$, $O_2$, Ar, and $SiCl_4$. The first blowtorch includes a raw material supply pipe located at a center of the first blowtorch for supplying a mixed gas of oxygen (shown by O1) and $SiCl_4$ and a seven-layer gas flow path concentrically arranged outside the raw material supply pipe. Hydrogen (shown by H1), hydrogen (shown by H2), argon (shown by Ar1), oxygen (shown by O2), argon (shown by Ar2), hydrogen (shown by H3), and argon (shown by Ar3) sequentially enter the seven-layer gas flow path from the center to the outside of the first blowtorch. Flow rates of $H_2$ entering the first blowtorch for depositing the core layer loose body are H1: 0.4 L/min, H2: 3.5 L/min, and H3: 17 L/min, flow rates of $O_2$ are O1: 15 L/min and O2: 17 L/min, flow rates of Ar are Ar1: 2.5 L/min, Ar2: 3 L/min, and Ar3: 4 L/min, and a flow rate of $SiCl_4$ is 2.5 g/min. The core layer loose body is obtained by deposition.

The second blowtorch includes a pipe located at a center of the second blowtorch for supplying hydrogen and a pipe for supplying oxygen arranged in a shape of a concentric circle outside the pipe for supplying the hydrogen. A flow rate of $H_2$ entering the second blowtorch used for manufacturing the silicon dioxide isolation layer is 13 L/min, a flow rate of $O_2$ is 11 L/min, and the silicon dioxide isolation layer is obtained.

The third blowtorch includes a raw material supply pipe located at a center of the third blowtorch for supplying a mixed gas of oxygen (shown by O3) and $SiCl_4$ and a seven-layer gas flow path concentrically arranged outside the raw material supply pipe. Hydrogen (shown by H4), hydrogen (shown by H5), a mixed gas of argon (shown by Ar4) and $CF_4$, oxygen (shown by O4), argon (shown by Ar5), hydrogen (shown by H6), and argon (shown by Ar6) sequentially enter the seven-layer gas flow path from the center to the outside of the third blowtorch. Flow rates of $H_2$ entering the third blowtorch for depositing the cladding layer loose body are H4: 2.5 L/min, H5: 3.5 L/min, and H6: 35 L/min, flow rates of $O_2$ are O3: 26 L/min and O4: 36 L/min, flow rates of Ar are Ar4: 2.5 L/min, Ar5: 4 L/min, and Ar6: 6 L/min, a flow rate of $SiCl_4$ is 18 g/min, and a flow rate of $CF_4$ is 2.5 g/min. The cladding layer loose body is obtained by deposition.

A flame length from a blowtorch mouth of the first blowtorch to the core rod loose body is 42 mm; a flame length from a blowtorch mouth of the second blowtorch to the core rod loose body is 83 mm; and a flame length from a blowtorch mouth of the third blowtorch to the core rod loose body is 125 mm.

A distance between a center point of the blowtorch mouth of the first blowtorch and a center point of the blowtorch mouth of the second blowtorch is 70 mm, and a distance between the center point of the blowtorch mouth of the second blowtorch and a center point of the blowtorch mouth of the third blowtorch is 120 mm.

After parameters of the three blowtorches are set, blowtorches are ignited to deposit the core rod loose body. The oxyhydrogen flame of the second blowtorch is used to increase the temperature of the formed core layer loose body to a range of 900-1000° C. As the local temperature rises, $SiO_2$ particles on the surface of the core layer loose body begin to contract, the core layer loose body contracts to form the silicon dioxide isolation layer on the surface, and the core rod loose body with the core layer loose body, the silicon dioxide isolation layer, and the cladding layer loose body sequentially arranged from the inside to the outside is obtained.

When the core rod loose body is manufactured, deposition starts on the hollow glass tube at a distance of 20 mm from a top end of the deposition tip. A deposition length of the core rod loose body is 600 mm. A diameter of the core layer loose body is 23.8 mm, a thickness of the silicon dioxide isolation layer is 1.06 mm, and a thickness of the cladding layer loose body is 58 mm. A density of the core layer loose body is 0.25 g/cm³, a density of the silicon dioxide isolation layer is 1.04 g/cm³, and a density of the cladding layer loose body is 0.3 g/cm³.

A deposition speed of the core rod loose body is 85 mm/h. A process temperature is 995° C. Finally, the core rod loose body with a length of 600 mm is obtained.

When the core rod loose body is manufactured, a sealing cover is used to seal the top end of the hollow glass tube body. The core layer loose body of the finally obtained core rod loose body is connected with the deposition tip.

After the core rod loose body is obtained, the core rod loose body is dehydrated, and during the dehydration, the sealing cover at the top end of the hollow glass tube body is removed. The dehydration atmosphere enters the core layer loose body through the hollow glass tube and penetrates from the outside to the inside of the cladding loose body. The dehydration atmosphere is composed of helium and chlorine, and in the dehydration atmosphere, a content of the chlorine is 7%. A pressure at which the dehydration atmosphere enters the core layer loose body through the hollow glass tube is 88 psi; and a pressure at which the dehydration atmosphere penetrates from the outside to the inside of the cladding layer loose body is 43 psi. A dehydration temperature is 1250° C.; and dehydration time is 2.5 hours. Finally, the dehydrated core rod loose body is obtained.

After the dehydration is completed, the dehydrated core rod loose body is sequentially sintered, extended, and washed corrosively, and an outer cladding layer is formed on the surface to obtain a preform.

After measuring, a refractive index of the core layer of the preform is 1.4572, a refractive index of an F doped first cladding layer is 1.45239, and Δ=−0.33%.

Next, the preform is drawn to obtain the optical fiber. A furnace temperature of the drawing is 1931° C., tension of the drawing is 210 g, a linear velocity of the drawing is 1000 m/min, and a length of the optical fiber after being drawn is 8 km. The optical fiber is obtained, and performance of the optical fibers is measured. Results are shown in Table 1, and Table 1 shows performance test results of optical fibers manufactured in embodiments 1 to 5.

Comparative Embodiment Four

The optical fiber is manufactured in accordance with process parameters of Embodiment Four, except that a solid glass target rod is used instead of the hollow glass tube in the embodiment. Performance of the optical fibers is measured. Results are shown in Table 2, and Table 2 shows performance test results of optical fibers manufactured in comparative embodiments 1 to 5.

Embodiment Five

A hollow glass tube is used as a target rod, and VAD method is adopted to manufacture a core rod loose body with a core layer loose body, a silicon dioxide isolation layer, and a cladding layer loose body arranged sequentially from inside out.

As shown in FIG. 2, the hollow glass tube includes a hollow tube body and an open deposition tip communicating with the tail end of the hollow tube body. The open deposition tip is conical, a length of the deposition tip is 20 mm, and a hole with a diameter of 6 mm is provided at the deposition tip. An inner diameter of the hollow tube body of the hollow glass tube is 30 mm, and an outer diameter of the hollow tube body of the hollow glass tube is 32 mm.

A chamber of a device for manufacturing the core rod loose body by VAD method is provided with a first blowtorch, a second blowtorch, and a third blowtorch sequentially arranged from bottom to top.

Gases entering the first blowtorch are $H_2$, $O_2$, Ar, and $SiCl_4$. The first blowtorch includes a raw material supply pipe located at a center of the first blowtorch for supplying a mixed gas of oxygen (shown by O1) and $SiCl_4$ and a seven-layer gas flow path concentrically arranged outside the raw material supply pipe. Hydrogen (shown by H1), hydrogen (shown by H2), argon (shown by Ar1), oxygen (shown by O2), argon (shown by Ar2), hydrogen (shown by H3), and argon (shown by Ar3) sequentially enter the seven-layer gas flow path from the center to the outside of the first blowtorch. Flow rates of $H_2$ entering the first blowtorch for depositing the core layer loose body are H1: 0.25 L/min, H2: 3 L/min, and H3: 15 L/min, flow rates of $O_2$ are O1: 13.5 L/min and O2: 15.5 L/min, flow rates of Ar are Ar1: 2.5 L/min, Ar2: 3 L/min, and Ar3: 4 L/min, and a flow rate of $SiCl_4$ is 2.1 g/min. The core layer loose body is obtained by deposition.

The second blowtorch includes a pipe located at a center of the second blowtorch for supplying hydrogen and a pipe for supplying oxygen arranged in a shape of a concentric circle outside the pipe for supplying the hydrogen. A flow rate of $H_2$ entering the second blowtorch used for manufacturing the silicon dioxide isolation layer is 13 L/min, a flow rate of $O_2$ is 11 L/min, and the silicon dioxide isolation layer is obtained.

The third blowtorch includes a raw material supply pipe located at a center of the third blowtorch for supplying a mixed gas of oxygen (shown by O3) and $SiCl_4$ and a seven-layer gas flow path concentrically arranged outside the raw material supply pipe. Hydrogen (shown by H4), hydrogen (shown by H5), a mixed gas of argon (shown by Ar4) and $CF_4$, oxygen (shown by O4), argon (shown by Ar5), hydrogen (shown by H6), and argon (shown by Ar6) sequentially enter the seven-layer gas flow path from the center to the outside of the third blowtorch. Flow rates of $H_2$ entering the third blowtorch for depositing the cladding layer loose body are H4: 2.5 L/min, H5: 3.5 L/min, and H6: 35 L/min, flow rates of $O_2$ are O3: 26 L/min and O4: 36 L/min, flow rates of Ar are Ar4: 2.5 L/min, Ar5: 4 L/min, and Ar6: 6 L/min, a flow rate of $SiCl_4$ is 25 g/min, and a flow rate of $CF_4$ is 3.5 g/min. The cladding layer loose body is obtained by deposition.

A flame length from a blowtorch mouth of the first blowtorch to the core rod loose body is 50 mm; a flame length from a blowtorch mouth of the second blowtorch to the core rod loose body is 88 mm; and a flame length from a blowtorch mouth of the third blowtorch to the core rod loose body is 156 mm.

A distance between a center point of the blowtorch mouth of the first blowtorch and a center point of the blowtorch mouth of the second blowtorch is 75 mm, and a distance between the center point of the blowtorch mouth of the second blowtorch and a center point of the blowtorch mouth of the third blowtorch is 120 mm.

After parameters of the three blowtorches are set, blowtorches are ignited to deposit the core rod loose body. The oxyhydrogen flame of the second blowtorch is used to increase the temperature of the formed core layer loose body to a range of 900-1000° C. As the local temperature rises, $SiO_2$ particles on the surface of the core layer loose body begin to contract, the core layer loose body contracts to form the silicon dioxide isolation layer on the surface, and the core rod loose body with the core layer loose body, the silicon dioxide isolation layer, and the cladding layer loose body sequentially arranged from the inside to the outside is obtained.

When the core rod loose body is manufactured, deposition on the hollow glass tube starts at a distance of 20 mm from a top end of the deposition tip. A deposition length of the core rod loose body is 800 mm. A diameter of the core layer loose body is 24 mm, a thickness of the silicon dioxide isolation layer is 1.05 mm, and a thickness of the cladding layer loose body is 60 mm. A density of the core layer loose body is 0.225 g/cm³, a density of the silicon dioxide isolation layer is 1.02 g/cm³, and a density of the cladding layer loose body is 0.33 g/cm³.

A deposition speed of the core rod loose body is 90 mm/h. A process temperature is 980° C. Finally, the core rod loose body with a length of 800 mm is obtained.

When the core rod loose body is manufactured, a sealing cover is used to seal the top end of the hollow glass tube body. The core layer loose body of the finally obtained core rod loose body is connected with the deposition tip.

After the core rod loose body is obtained, the core rod loose body is dehydrated, and during the dehydration, the sealing cover at the top end of the hollow glass tube body is removed. The dehydration atmosphere enters the core layer loose body through the hollow glass tube and penetrates from the outside to the inside of the cladding loose body. The dehydration atmosphere is composed of helium and chlorine, and in the dehydration atmosphere, a content of the chlorine is 8%. A pressure at which the dehydration atmosphere enters the core layer loose body through the hollow glass tube is 90 psi; and a pressure at which the dehydration atmosphere penetrates from the outside to the inside of the cladding layer loose body is 45 psi. A dehydration temperature is 1250° C.; and dehydration time is 2.5 hours. Finally, the dehydrated core rod loose body is obtained.

After the dehydration is completed, the dehydrated core rod loose body is sequentially sintered, extended, and washed corrosively, and an outer cladding layer is formed on the surface to obtain a preform.

After measuring, a refractive index of the core layer of the preform is 1.4572, a refractive index of an F doped first cladding layer is 1.45253, and Δ=−0.32%.

Next, the preform is drawn to obtain the optical fiber. A furnace temperature of the drawing is 1875° C., tension of the drawing is 260 g, a linear velocity of the drawing is 1000 m/min, and a length of the optical fiber after being drawn is 10 km. The optical fiber is obtained, and performance of the optical fibers is measured. Results are shown in Table 1, and Table 1 shows performance test results of optical fibers manufactured in embodiments 1 to 5.

Comparative Embodiment Five

The optical fiber is manufactured in accordance with process parameters of Embodiment Five, except that a solid glass target rod is used instead of the hollow glass tube in the embodiment. Performance of the optical fibers is measured. Results are shown in Table 2, and Table 2 shows performance test results of optical fibers manufactured in comparative embodiments 1 to 5.

The above are only preferred embodiments of this invention. It should be noted that those skilled in the art can also make improvements and modifications without departing from the principle of this invention, and these improvements and modifications should be regarded to be within the protection scope of this invention.

What is claimed is:
1. A manufacturing method for an optical fiber, comprising
using a hollow glass tube as a target rod, adopting a vapor phase axial deposition (VAD) to make a core rod loose body with a core layer loose body, a silicon dioxide isolation layer, and a cladding layer loose body sequentially arranged from inside out, and using a first blowtorch, a second blowtorch, and a third blowtorch for deposition;
forming the core layer loose body using the first blowtorch, wherein gases entering the first blowtorch are $H_2$, $O_2$, Ar, and $SiCl_4$;

forming the silicon dioxide isolation layer using the second blowtorch, wherein gases entering the second blowtorch are $H_2$ and $O_2$, a flow rate of $H_2$ entering the second blowtorch is in a range of 12-15 L/min, and a flow rate of $O_2$ entering the second blowtorch is in a range of 10-12 L/min;

forming the cladding layer loose body using the third blowtorch, wherein gases entering the third blowtorch are $H_2$, $O_2$, Ar, $SiCl_4$, and $CF_4$; and wherein the hollow glass tube comprises a hollow tube body and an open deposition tip communicating with a tail end of the hollow tube body, and the core layer loose body is connected with the open deposition tip;

dehydrating the core rod loose body, wherein a dehydration atmosphere enters the core layer loose body through the hollow glass tube and penetrates from an outside to an inside of the cladding layer loose body, and a dehydrated core rod loose body is obtained;

sequentially sintering, extending, and washing corrosively the dehydrated core rod loose body and forming an outer cladding layer on a surface to obtain a preform; and drawing the preform to obtain an optical fiber;

wherein the open deposition tip is conical, a length of the open deposition tip is in a range of 20-22 mm, a hole with a diameter in a range of 6-7 mm is provided at the open deposition tip, an inner diameter of the hollow tube body is in a range of 30-31 mm, and an outer diameter of the hollow tube body is in a range of 32-34 mm;

wherein a pressure at which the dehydration atmosphere enters the core layer loose body through the hollow glass tube is in a range of 80-90 psi, and a pressure at which the dehydration atmosphere penetrates from an outside to an inside of the cladding layer loose body is in a range of 35-45 psi.

2. The manufacturing method according to claim 1, wherein the first blowtorch, the second blowtorch, and the third blowtorch are sequentially arranged from bottom to top.

3. The manufacturing method according to claim 1, wherein the first blowtorch and the second blowtorch are arranged in parallel, an angle between the first blowtorch and a horizontal plane is in a range of 38°-50°, and an angle between the third blowtorch and the horizontal plane is in a range of 35°-45°.

4. The manufacturing method according to claim 1, wherein a flame length from a blowtorch mouth of the first blowtorch to the core rod loose body is in a range of 40-50 mm; a flame length from a blowtorch mouth of the second blowtorch to the core rod loose body is in a range of 80-90 mm; and a flame length from a blowtorch mouth of the third blowtorch to the core rod loose body is in a range of 120-160 mm.

5. The manufacturing method according to claim 1, wherein a distance between a center point of a blowtorch mouth of the first blowtorch and a center point of a blowtorch mouth of the second blowtorch is in a range of 70-80 mm, and a distance between the center point of the blowtorch mouth of the second blowtorch and a center point of a blowtorch mouth of the third blowtorch is in a range of 100-130 mm.

6. The manufacturing method according to claim 1, wherein the first blowtorch comprises a raw material supply pipe located at a center of the first blowtorch for supplying a mixed gas of oxygen and $SiCl_4$ and a seven-layer gas flow path concentrically arranged outside the raw material supply pipe, hydrogen, hydrogen, argon, oxygen, argon, hydrogen, and argon sequentially enter the seven-layer gas flow path from the center to an outside of the first blowtorch, a flow rate of the oxygen entering the raw material supply pipe is in a range of 13-15 L/min, and a flow rate of $SiCl_4$ is in a range of 2-3 g/min; and flow rates of gases entering the seven-layer gas flow path are sequentially in ranges of 0.2-0.5 L/min, 2-4 L/min, 2-3 L/min, 15-17 L/min, 3-4 L/min, 13-17 L/min, and 4-5 L/min from the center to the outside of the first blowtorch;

wherein the second blowtorch comprises a pipe located at a center of the second blowtorch for supplying hydrogen and a pipe for supplying oxygen arranged in a shape of a concentric circle outside the pipe for supplying the hydrogen;

wherein the third blowtorch comprises a raw material supply pipe located at a center of the third blowtorch for supplying a mixed gas of oxygen and $SiCl_4$ and a seven-layer gas flow path concentrically arranged outside the raw material supply pipe, hydrogen, hydrogen, a mixed gas of argon and $CF_4$, oxygen, argon, hydrogen, and argon sequentially enter the seven-layer gas flow path from the center to an outside of the third blowtorch, a flow rate of the oxygen entering the raw material supply pipe is in a range of 25-27 L/min, a flow rate of $SiCl_4$ is in a range of 15-25 g/min, and flow rates of gases entering the seven-layer gas flow path are sequentially in ranges of 2-3 L/min, 3-5 L/min, 3-7 L/min, 35-40 L/min, 4-5 L/min, 35-45 L/min, and 6-7 L/min from the center to the outside of the third blowtorch, wherein a total flow rate of the mixed gas of argon and $CF_4$ is in a range of 3-7 L/min, a flow rate of argon is in a range of 2-3 L/min, and a flow rate of $CF_4$ is in a range of 1-4 L/min.

7. The manufacturing method according to claim 1, wherein the dehydration atmosphere is composed of helium and chlorine, and in the dehydration atmosphere, a content of the chlorine is in a range of 4% to 8%.

8. The manufacturing method according to claim 1, wherein a dehydration temperature of the dehydrating in the step B) is in a range of 1245-1255° C.; and dehydration time of the dehydrating in the step B) is in a range of 2.5-3 hours.

9. The manufacturing method according to claim 1, wherein when the core rod loose body is manufactured, a top end of the hollow tube body is sealed; and when the core rod loose body is dehydrated, the top end of the hollow tube body is open.

10. The manufacturing method according to claim 1, wherein when the core rod loose body is manufactured, deposition starts on the hollow glass tube at a distance of 20 mm from a top end of the open deposition tip.

11. The manufacturing method according to claim 1, wherein a deposition length of the core rod loose body manufactured by the VAD method is in a range of 500-1100 mm, and a deposition speed of the core rod loose body is in a range of 80-90 mm/h; and a diameter of the core layer loose body is in a range of 23.8-24.3 mm, a thickness of the silicon dioxide isolation layer is in a range of 0.8-1.2 mm, and a thickness of the cladding layer loose body is in a range of 50-60 mm.

12. The manufacturing method according to claim 1, wherein a density of the core layer loose body is in a range of 0.2-0.25 $g/cm^3$, a density of the silicon dioxide isolation layer is in a range of 0.9-1.13 $g/cm^3$, and a density of the cladding layer loose body is in a range of 0.28-0.33 $g/cm^3$.

13. The manufacturing method according to claim 1, wherein a furnace temperature for the drawing is in a range of 1950-2050° C., tension of the drawing is in a range of 100-230 g, a linear velocity of the drawing is in a range of 980-1050 m/min, and a length of the optical fiber after being drawn is in a range of 8-15 km.

* * * * *